Patented Feb. 7, 1939

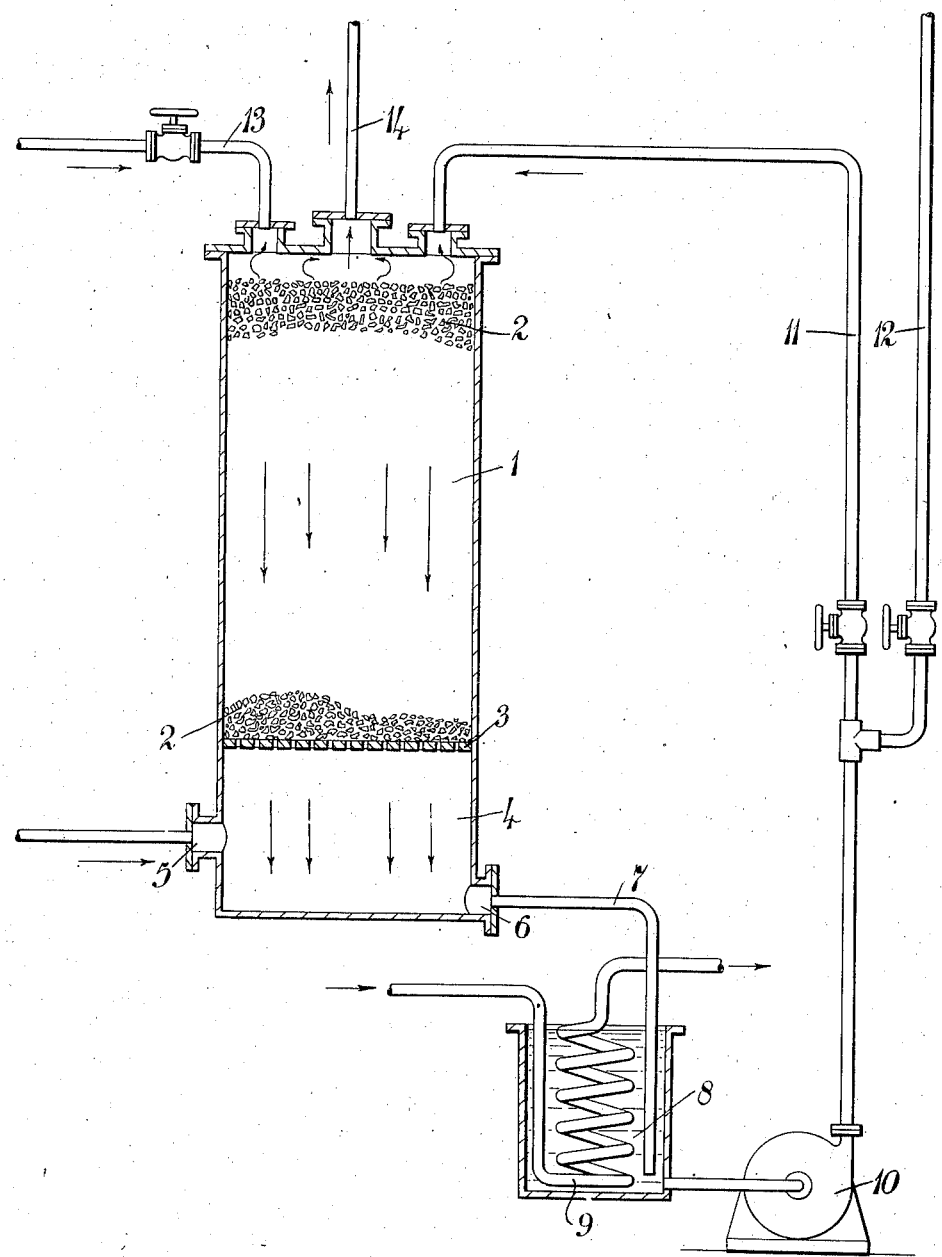

2,146,326

UNITED STATES PATENT OFFICE 2,146,326

PROCESS FOR OBTAINING ALCOHOL BY FERMENTATION OF LIQUIDS CONTAINING CARBOHYDRATE

Friedrich Bergius, Heidelberg, Hugo Koch, Mannheim-Rheinau, and Hermann Zimmermann, Heidelberg, Germany, assignors to N. V. Internationale Suiker En Alcohol Compagnie International Sugar and Alcohol Company "Isaco", The Hague, Netherlands Application November 17, 1936, Serial No. 111,316
In Germany November 22, 1935

4 Claims. (Cl. 195—37)

It is known in the fermentation of liquids containing carbohydrate to allow the liquid to circulate and to keep it in continuous motion in order to avoid disturbances due to the reaction products. It is also known to provide supporting surfaces for the fermentation stimulant in the fermentation bath. Finally, for the purpose of directly removing excess yeast from the liquid maintained in circulation, the fermentation baths have already been provided with installed metal sheets, boards, twigs, rods and the like in such a way that the flow in the ascending fluid was checked and the circulating motion limited to the lowermost zone of the vat.

According to the present invention the fermentation liquid containing suspended yeast is allowed to circulate but it is led from the top to the bottom in the fermentation container, and in fact so that it is divided up into thin layers by trickling.

The division of the liquid into thin trickling layers is most simply effected by allowing it to trickle through a tower, from the top to the bottom thereof, which is provided with filling bodies of known kind or with rigid installed elements arranged so that the directions of their surfaces over which the liquid trickles intersect in space. These filling bodies and installed elements not only offer known favorable attachment surfaces for the fermentation organisms, but through them the liquid experiences a continuous change in direction and acquires a large surface, so that the particles are continuously mixed. The trickling surfaces are throughout in contact with gas spaces so that gaseous products of the action can freely escape.

The contact of the liquid with gas spaces over extended surfaces at the same time enables gases supplied to be absorbed, such as air for example in the case of the production of yeast. This gas supply can here be effected with a very small expenditure of power since, contrary to what has heretofore been usual, the resistance of a high and unbroken liquid layer does not have to be overcome.

In consequence of the continuous thorough mixing of the trickling liquid mass the best conditions for the fermentation can be continuously created, the dissolved nutrient substances added even in higher concentrations and as a result operations can be carried out at concentrations which on an average are higher than formerly.

The invention may be carried out with employment of trickle towers such as are known for other purposes. A tower of this kind arranged suitably for carrying out the process of the invention is shown schematically in the accompanying drawing by way of example.

The tower 1 is filled with filling bodies 2. The filling rests in the usual way on a sieve bottom 3 above a bottom chamber 4 in which latter the trickling liquid collects and which is provided with an inlet union 5 for air or gas. Through the outlet union 6 the liquid passes through a pipe 7 into the container 8 with the pipe coil 9 for regulating the temperature.

The liquid is withdrawn from the container 8 by means of a circulating pump 10, which pump returns it through pipe 11 into the tower 1 again. A part of the liquid is led off through the branch pipe 12 for the purpose of separating the fermentation products therefrom, alcohol and/or yeast. The supply of fresh wort is effected at the top end of the tower through the pipe 13. The gases leave the tower in the direction of the arrow 14.

For the fermentation of wood sugar, the usual Raschig rings of porcelain can be used with advantage as filling for the container. These rings exhibit no preceptible clogging even after lengthy periods of operation.

In a tower plant of the kind shown in the drawing it is possible to diminish the time for the fermentation of sugar to alcohol down to below seven hours, whilst in the usual methods of fermentation times of 40–70 hours are necessary. In the production of yeast it has been possible to diminish the fermentation time from twelve to about two to three hours.

In the production of yeast the air introduced through the union 5 had a pressure of about 100 mm. of water for a tower height of about 3 m. The liquid flowing from the tower in the container 8 was kept at the usual temperature of 30–32° C.

What we claim is:—

1. A method of fermenting carbohydrate-containing liquids for the purpose of obtaining alcohol, consisting in passing the fermentation liquid containing suspended yeast round a circuit which includes a region in which the said liquid is caused to trickle downwardly in surface-extended form with constant change in direction.

2. A method of fermenting carbohydrate-containing liquids for the purpose of obtaining alcohol, consisting in passing the fermentation liquid containing suspended yeast round a circuit which includes a region in which the said liquid is caused to trickle downwardly in surface-extended form with constant change in direction, and withdrawing a part of the fermentation liquid from the circuit, after it has traversed said region, for the purpose of recovering fermentation products therefrom.

3. A method of fermenting carbohydrate-containing liquids for the purpose of obtaining alcohol, consisting in passing the fermentation liquid containing suspended yeast round a circuit which includes a region in which the said liquid is caused to trickle downwardly with constant change of direction in surface-extended form in contact with gas spaces, through which latter gases evolved during the fermentation can escape, and withdrawing a part of the fermentation liquid from the circuit, after it has traversed said region, for the purpose of recovering fermentation products therefrom.

4. A method as claimed in claim 1 in which the temperature of the circulating liquid is regulated at one part of the circuit.

FRIEDRICH BERGIUS.
HUGO KOCH.
HERMANN ZIMMERMANN,